United States Patent Office 2,846,441
Patented Aug. 5, 1958

2,846,441

PRODUCTION OF A SOLVENT-STABLE ALPHA-MODIFICATION OF COPPER PHTHALOCYANINE

Fritz Muehlbauer, Robert Zell, Erwin Plankenhorn, and Erich Jutz, Ludwigshafen (Rhine), Germany, assignors to Badische Anilin- & Soda-Fabrik Aktiengesellschaft, Ludwigshafen (Rhine), Germany No Drawing. Application August 17, 1954
Serial No. 450,537

Claims priority, application Germany August 29, 1953

12 Claims. (Cl. 260—314.5)

This invention relates to a solvent-stable alpha-modification of copper phthalocyanine and a process of producing same.

Of the various modifications of copper phthalocyanine it is known that the so-called alpha-modification has the greatest color strength. This alpha-modification, however, generally speaking is not solvent-stable, i. e. in the presence of solvents usual in the lacquer industry, as benzene, toluene, and xylene, it is converted more or less rapidly into the beta-modification which is of less coloristic value. The methods hitherto proposed to obviate this drawback are in part very troublesome and in general unreliable.

We have now found that a solvent-stable alpha-modification of copper phthalocyanine is obtained in a simple manner by dissolving in concentrated sulfuric acid unsubstituted cooper phthalocyanine and such amounts of a copper phthalocyanine having in a 4-position of the benzene nuclei from 1 to 4 chlorine atoms, nitro or amino groups that from 1 to 8 mol of the mixture contain one of said substituents, pouring the solution into hot water and recovering the precipitates.

Substituted copper phthalocyanines, which act as stabilizer for the alpha-modification, are for example 4 - chloro, 4,4' - dichlor, 4.4'.4'''-trichlor, 4.4'.4''.4'''-tetrachlor copper phthalocyanine and the corresponding nitro and amino compounds. The amounts of these stabilizers are so chosen that from 1 to 8 mol of the mixture of copper phthalocyanine and the "stabilizer" contain one of said substituents. The shade of the dyestuff is then practically the same as with the unsubstituted copper phthalocyanine; the alpha-modification prepared therefrom is, however, stable to boiling for several hours with benzene, toluene or xylene.

Appropriate mixtures of copper phthalocyanine and the stabilizer may be prepared by simple mixing of unsubstituted copper phthalocyanine and the stabilizer or by heating appropriate mixtures of phthalic acid and 4-chlor- or 4-amino- or 4-nitro-phthalic acid known for the production of phthalocyanines.

These mixtures obtained in any of foregoing manners are transformed into the alpha-modification by dissolving them in concentrated sulfuric acid, pouring these solutions into hot water and recovering the precipitates.

It is remarkable that the said substituents in the stabilizers do not have a stabilizing action in the 3- or 6-position of the benzene rings; the stabilisation effected by dual substitution in positions 4 and 5 is also clearly less than attainable by substitution in the 4-position alone.

The following examples will further illustrate this invention but the invention is not restricted to these examples. The parts are parts by weight.

Example 1

100 parts of phthalic anhydride are heated with 6 parts of 4-chlorphthalic anhydride, 180 parts of urea, 21 parts of cuprous chloride, 1.5 parts of molybdic acid and 500 parts of trichlorbenzene while stirring first for 2 hours at 160° C. and then for another 4 to 5 hours at 200° C. The dyestuff formed is filtered off by suction, freed from trichlorbenzene or nitrobenzene by blowing with steam or washing with methanol, purified by boiling up with dilute hydrochloric acid, washed well with water and finally dried. The yield is 94 parts.

For conversion into the alpha-modification, the dyestuff is dissolved in 1000 parts of concentrated sulfuric acid, the solution is stirred into 16,000 parts of hot water, filtered by suction, washed, dried and ground. 92 parts of a soft, loose powder are obtained with a chlorine content of 1.4% which, on the basis of X-ray spectra, consists entirely of the alpha-modification.

After boiling for 2 hours in benzene, the dyestuff still contains 60% of the alpha-modification with 40% of the beta-modification. The dyestuff prepared in the same way by the co-employment of 3-chlor- instead of 4-chlor-phthalic acid and likewise converted into the alpha-modification is completely converted into the beta-modification by boiling with benzene.

Example 2

For the preparation of the dyestuff, 12 parts of 4-chlorphthalic acid are used, i. e. twice the amount in Example 1, but otherwise the procedure of Example 1 is followed exactly.

The dyestuff converted into the alpha-modification contains 1.9% of chlorine. After boiling for 2 hours in benzene 90% is still present in the alpha-modification, only 10% having been converted into the beta-modification; after boiling for 2 hours with xylene, the content of alpha-modification is still 80% and the color strength remains practically unchanged.

The dyestuff prepared with the same amount of 3-chlorphthalic acid is completely converted into the beta-modification of less color strength by boiling for 2 hours with benzene or xylene.

Example 3

115 parts of unsubstituted copper phthalocyanine and 61 parts of 4-monochlor copper phthalocyanine are dissolved in 1700 parts of concentrated sulfuric acid while stirring. After 4 hours, the solution is stirred into 27,500 parts of hot water, the dyestuff is filtered off by suction, washed, dried, and ground in the usual way. 165 parts of a blue powder of good color strength with 2.02% of chlorine are obtained which consists of pure alpha-modification. After boiling for 2 hours in xylene it still has practically the same color strength X-ray analysis shows that it still contains 80% of the alpha-modification and only 20% of the beta-modification.

The product prepared with the aid of 61 parts of 3-chlor- instead of 4-chlor-copper phthalocyanine is completely converted into the beta-modification and has become weak in color after boiling in benzene for 2 hours.

Example 4

In the method of working descirbed in Example 3, instead of 4-monochlor copper phthalocyanine there are employed 4.4'-dichlor, 4.4'.4''-trichlor- or 4.4'.4''.4'''-tetrachlor copper phthalocyanine and correspondingly larger amounts of unsubstituted copper phthalocyanine so that on an average there is allotted a maximum of one chlorine atom to each dyestuff molecule. Thus for example 236 parts of unsubstituted copper phthalocyanine and 64 parts of 4.4'-dichlor derivative, or 460 parts of unsubstituted dyestuff and 68 parts of 4.4'.4''-trichlor derivative or 633 parts of unsubstituted dyestuff and 71 parts of 4.4'.4''.4'''-tetrachlor derivative are used. In all cases products of similar properties are obtained, whereas the dyestuffs obtained with the corresponding products chlorinated in the 3-position are not solvent-stable.

*Example 5*

162 parts of 4-chlorphthalonitrile, 1408 parts of unsubstituted phthalonitrile, 450 parts of cuprous chloride, 14,000 parts of nitrobenzene and 85 parts of pyridine are heated for 4 to 5 hours at 180° to 200° C. By working up according to Example 1 there are obtained at first 1650 parts of a dyestuff crystallized in fine needles which is converted into the alpha-modification by dissolving it in 10 times the amount of concentrated sulfuric acid, precipitation with hot water, washing, drying, and grinding. This contains 2.0 to 2.2% of chlorine and has a very good stability to boiling with xylene. The analogous dyestuff prepared with the co-employment of 3-chlorphthalonitrile, however, is unstable to solvents.

The following table shows the effect of a number of chlorine substituents or some other substituents in 4-position, the amounts of alpha- and beta-modification ascertained by X-ray analysis after boiling with benzene or xylene being given in each case and the difference in effect of the same substituents in 3-position:

| phthalic anhydride condensed with— | chlorine content or additional nitrogen content | after boiling for 2 hours in benzene | after boiling for 2 hours in xylene |
|---|---|---|---|
| 3.6-dichlorphthalic anhydride | 1.9% Cl | 100% beta | 100% beta. |
| 4.5-dichlorphthalic anhydride | 2.0% Cl | 60% alpha+ 40% beta | 30% alpha+ 70% beta. |
| 3-chlorphthalic anhydride+4-chlorphthalic anhydride | 1.8% Cl | 40% alpha+ 60% beta | 20% alpha+ 80% beta. |
| tetrachlorphthalic anhydride | 2.8% Cl | 50% alpha+ 50% beta | 30% alpha+ 70% beta. |
| 4-nitrophthalic acid | 0.5% N | 90% alpha+ 10% beta | 70% alpha+ 30% beta. |
| 3-nitrophthalic acid | 0.6% N | 50% alpha+ 50% beta | 30% alpha+ 70% beta. |
| 3-aminophthalic acid | 0.45% N | 40% alpha+ 60% beta | 10% alpha+ 90% beta. |
| 4-aminophthalic acid | 0.40% N | 80% alpha+ 20% beta | 70% alpha+ 30% beta. |

What we claim is:

1. A process for the production of a solvent-stable copper phthalocyanine alpha-modification which comprises dissolving in concentrated sulfuric acid unsubstituted copper phthalocyanine and such an amount of copper phthalocyanine which is substituted only in the 4-positions of the benzene nuclei with from 1 to 4 radicals of the group consisting of chlorine, nitro, and amino that there is present in solution one said radical for from 1 to 8 molecules of phthalocyanine, pouring the solution into hot water, and recovering the resulting precipitate.

2. A process for the production of a solvent-stable copper phthalocyanine alpha-modification which comprises dissolving in concentrated sulfuric acid unsubstituted copper phthalocyanine and such an amount of copper phthalocyanine which is substituted only in the 4-positions of the benzene nuclei with from 1 to 4 chlorine atoms that there is present in solution one chlorine atom for from 1 to 8 molecules of phthalocyanine, pouring the solution into hot water, and recovering the resulting precipitate.

3. A process for the production of a solvent-stable copper phthalocyanine alpha-modification which comprises dissolving in concentrated sulfuric acid unsubstituted copper phthalocyanine and such an amount of copper phthalocyanine which is substituted only in the 4-positions of the benzene nuclei with from 1 to 4 nitro radicals that there is present in solution one nitro radical for from 1 to 8 molecules of phthalocyanine, pouring the solution into hot water, and recovering the resulting precipitate.

4. A process for the production of a solvent-stable copper phthalocyanine alpha-modification which comprises dissolving in concentrated sulfuric acid unsubstituted copper phthalocyanine and such an amount of copper phthalocyanine which is substituted only in the 4-positions of the benzene nuclei with from 1 to 4 amino radicals that there is present in solution one amino radical for from 1 to 8 molecules of phthalocyanine, pouring the solution into hot water, and recovering the resulting precipitate.

5. A process for the production of a solvent-stable copper phthalocyanine alpha-modification which comprises dissolving in concentrated sulfuric acid unsubstituted copper phthalocyanine and such an amount of 4-monochlor copper phthalocyanine that there is present in solution one chlorine atom for from 1 to 8 molecules of phthalocyanine, pouring the solution into hot water, and recovering the resulting precipitate.

6. A process for the production of the solvent-stable copper phthalocyanine alpha-modification which comprises dissolving in concentrated sulfuric acid unsubstituted copper phthalocyanine and such an amount of 4-monochlor copper phthalocyanine that there is present in solution from about 1.4 to 2.2 percent chlorine, pouring the solution into hot water, and recovering the resulting precipitate.

7. A solvent-stable copper phthalocyanine alpha-modification containing from about 1.4 to 2.2 percent chlorine substituted only in the 4-positions of the benzene nuclei.

8. A solvent-stable copper phthalocyanine alpha-modification comprising an alpha-modified mixture of an unsubstituted copper phthalocyanine and such an amount of copper phthalocyanine, which is substituted only in the 4-positions of the benzene nuclei with from 1 to 4 radicals of the group consisting of chlorine, nitro and amino, that there is present in said mixture one of said radicals for from 1 to 8 molecules of phthalocyanine.

9. A solvent-stable alpha-modified copper phthalocyanine dyestuff as claimed in claim 8 finely dispersed in a lacquer solvent.

10. A solvent-stable copper phthalocyanine alpha-modification comprising an alpha-modified mixture of an unsubstituted copper phthalocyanine and such an amount of copper phthalocyanine, which is substituted only in the 4-positions of the benzene nuclei with from 1 to 4 chlorine atoms, that there is present in said mixture one chlorine atom for from 1 to 8 molecules of phthalocyanine.

11. A solvent-stable copper phthalocyanine alpha-modification comprising an alpha-modified mixture of an unsubstituted copper phthalocyanine and such an amount of copper phthalocyanine, which is substituted only in the 4-positions of the benzene nuclei with from 1 to 4 nitro radicals, that there is present in said mixture one nitro radical for from 1 to 8 molecules of phthalocyanine.

12. A solvent-stable copper phthalocyanine alpha-modification comprising an alpha-modified mixture of an unsubstituted copper phthalocyanine and such an amount of copper phthalocyanine, which is substituted only in the 4-positions of the benzene nuclei with from 1 to 4 amino radicals, that there is present in said mixture one amino radical for from 1 to 8 molecules of phthalocyanine.

References Cited in the file of this patent

UNITED STATES PATENTS

| 2,192,704 | Dahlen et al. | Mar. 5, 1940 |
| 2,613,128 | Baumann et al. | Oct. 7, 1952 |
| 2,615,027 | Bluemmel et al. | Oct. 21, 1952 |
| 2,618,642 | Keller et al. | Nov. 18, 1952 |
| 2,713,005 | Baunsgaard et al. | July 12, 1955 |

OTHER REFERENCES

Journal Soc. Dyers and Colourists, March 1945, pages 68–73.